United States Patent [19]

Madsen

[11] 4,244,614
[45] Jan. 13, 1981

[54] CLAM GUN WITH VENT MECHANISM FOR EASING WITHDRAWAL FROM THE SAND

[76] Inventor: Walter M. Madsen, P.O. Box 495 Jefferson St., Madras, Oreg. 97741

[21] Appl. No.: 8,245

[22] Filed: Feb. 1, 1979

[51] Int. Cl.³ ............................................. A01B 1/00
[52] U.S. Cl. .................................. 294/50.7; 73/425.2
[58] Field of Search ...................... 294/50, 50.5, 50.6, 294/50.7; 30/316; 37/55, 119; 73/425, 425.2; 172/22; 175/20, 245

[56] References Cited

U.S. PATENT DOCUMENTS

| | | | |
|---|---|---|---|
| 2,361,067 | 10/1944 | Shaw | 73/425.2 |
| 2,802,689 | 8/1957 | Batstone | 294/50.7 |
| 3,089,721 | 5/1963 | Puckett | 294/50.7 |
| 3,221,558 | 12/1965 | Lagergren | 73/425 X |
| 3,416,374 | 12/1968 | Smith | 73/425.2 |

*Primary Examiner*—Johnny D. Cherry

[57] ABSTRACT

The specification discloses a clam gun for manually excavating clams from subsurface locations along sandy beaches. The clam gun includes a cylindrical sand housing whose upper end wall is secured to the lower end of a vertically extending tubular handle shaft. The upper end of the handle shaft is secured to a horizontally extending tubular handle. A pipe is mounted inside the housing adjacent its side wall and extends vertically from the open lower end of the housing through its upper end wall. A valve plug is slidably mounted in the lower end of the pipe and is movable to seal the same when the housing is inserted into the beach sand to prevent the pipe from becoming clogged with sand. Upon withdrawal of the housing from the beach sand, the valve plug moves to open the pipe. Air is vented through the pipe to the region adjacent the lower end of the housing to prevent the formation of a partial vacuum which otherwise makes withdrawal substantially more difficult.

2 Claims, 3 Drawing Figures

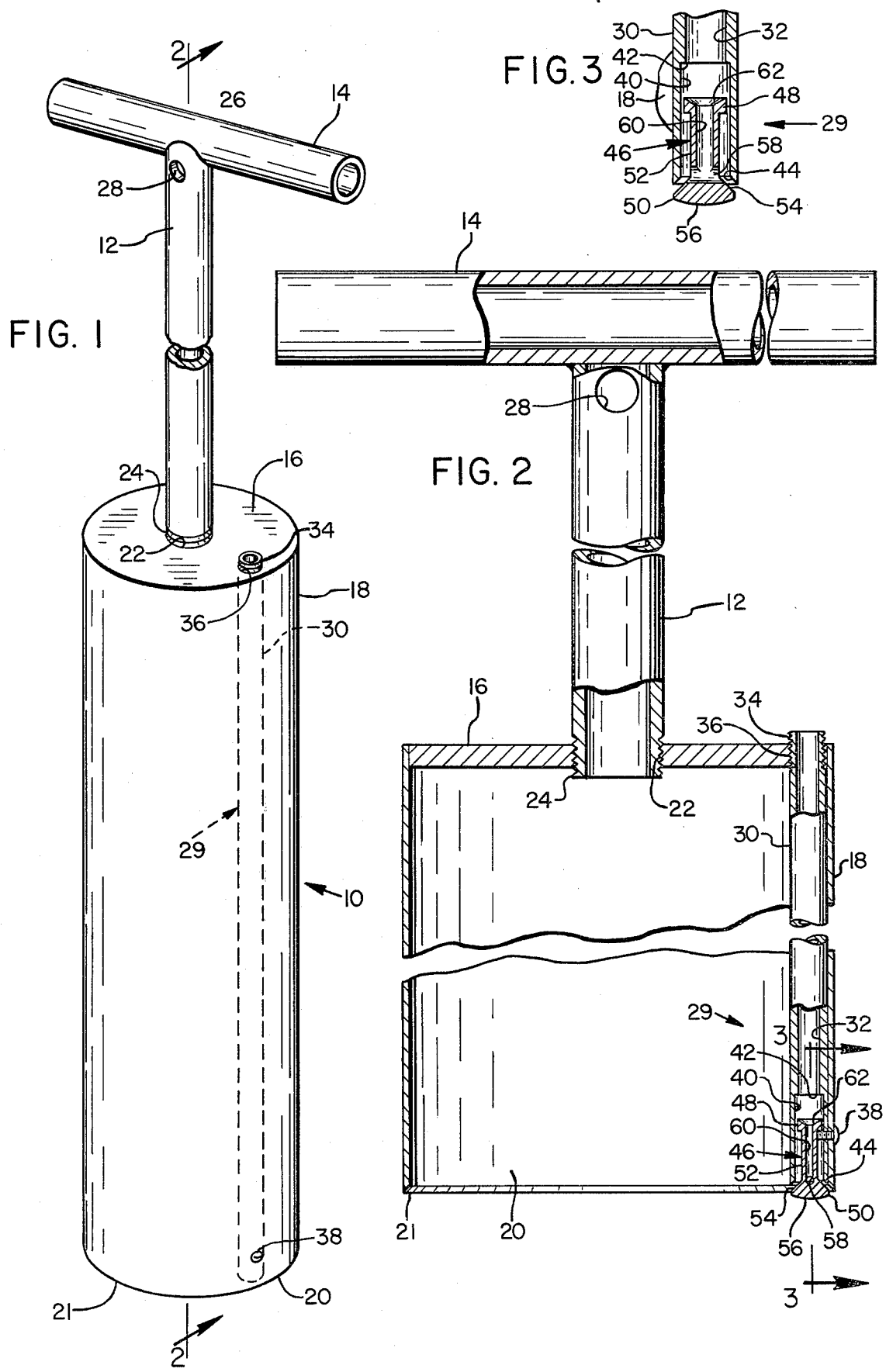

CLAM GUN WITH VENT MECHANISM FOR EASING WITHDRAWAL FROM THE SAND

BACKGROUND OF THE INVENTION

The present invention relates to apparatus for digging clams, and more particularly to a clam gun for manually excavating clams from subsurface locations along sandy beaches.

Non-commercial clam digging is a popular sport along sandy beaches and other tidal areas where clams can be found. The subsurface location of a particular clam can be identified by the presence of air bubbles. Clam digging with a conventional shovel has proven to be laborious and time consuming.

A number of manual apparatus have been developed for quickly and easily excavating clams. One such apparatus is generally referred to as a clam gun. U.S. Pat. Nos. 2,802,689 and 3,089,721 disclose conventional clam guns. Each has a generally cylindrical sand housing having an upper end wall and an open lower end. The lower end of a vertically extending tube is secured to the upper end wall of the housing. The bore of the tube communicates with the interior of the housing. A horizontally extending handle is provided for forcing the housing into the wet beach sand hopefully about a clam. Thereafter, an outlet aperture at the upper end of the tube is covered with a thumb or finger. When the user begins to withdraw the housing from the beach sand, a partial vacuum is created in the interior of the housing above the sand contained therein. When the housing is completely withdrawn a core of sand and hopefully a clam embedded therein are removed. Thereafter the housing is moved to a convenient discharge location and the outlet aperture is uncovered to release the partial vacuum. The core of sand and the clam embedded therein fall out of the housing and the clam is readily retrieved by hand.

A principle drawback of conventional clam guns has been the amount of force which is required to withdraw the housing from the beach sand. As the user begins to withdraw the housing, a partial vacuum is created in the resulting cavity in the beach sand adjacent the lower end of the housing. This partial vacuum creates a suction effect which impedes withdrawal of the housing. Substantial upward pulling forces have been required to overcome the suction effect. Thus, the use of a conventional clam gun has been a strenuous activity often quickly exhausting the user.

In addition, the suction effect increases in magnitude in proportion to the increase in the cross-sectional area of the clam gun housing. If the suction effect could be eliminated, clam gun housings of significantly larger interior volume could be made. This would increase the likelihood of clam retrieval. Clam guns heretofore known have not included any means for eliminating the suction effect.

SUMMARY OF THE INVENTION

It is an object of the present invention to provide a clam gun for manually excavating clams from subsurface locations along sandy beaches.

It is another object of the present invention to provide a clam gun which can be more easily withdrawn from the beach sand.

It is another object of the present invention to provide a clam gun with a vent mechanism for preventing the formation of a partial vacuum underneath its housing which otherwise makes withdrawal from the beach sand substantially more difficult.

It is yet another object of the present invention to provide a clam gun vent mechanism of the aforementioned type which will not become clogged with sand when the housing is inserted into the beach sand.

It is a further object of the present invention to provide a clam gun having a first means for venting air to the lower end of its housing and a second means for selectively venting air to the upper portion of the interior of the housing.

The present invention provides an apparatus for digging clams from subsurface locations in beach sand. The apparatus includes a housing having an open lower end adapted to be inserted into the beach sand and thereafter withdrawn to remove a core of sand contained therein from the beach sand. The apparatus further includes means for venting air to the region beneath the core of sand during withdrawal of the housing from the beach sand.

BRIEF DESCRIPTION OF THE DRAWINGS

FIG. 1 is an elevational view of one embodiment of the clam gun of the present invention;

FIG. 2 is an enlarged sectional view taken along line 2—2 of FIG. 1; and

FIG. 3 is an enlarged sectional view taken along line 3—3 of FIG. 2.

DESCRIPTION OF THE PREFERRED EMBODIMENT

Referring to FIG. 1, the illustrated embodiment of the clam gun of the present invention includes a cylindrical sand housing 10 which is secured to the lower end of a vertically extending tubular handle shaft 12. The upper end of the handle shaft 12 is secured to a horizontally extending tubular handle 14. The handle 14 is grasped by the user to insert and withdraw the housing from the beach sand.

The housing 10 has a horizontal upper end wall 16, a vertically extending side wall 18, and an open lower end 20. The housing and the other parts of the clam gun are preferably made of a non-rusting metal such as aluminum, brass or galvanized steel for strength and durability. The radial width of the sidewall 18 must be sufficiently large to give adequate strength but sufficiently small to permit the housing 10 to be readily inserted into the beach sand along the axis of the cylinder. As shown in FIG. 2, the lower edge 21 of the housing is preferably beveled to facilitate insertion.

The interior of the housing 10 defines a sand chamber of preferably about sixteen inches in height and above five to six inches in diameter. The upper end wall 16 of the housing 10 has an internally threaded hole 22 through its center. The externally threaded open lower end 24 of the tubular handle shaft 12 is screwed into the hole 22 so that the shaft extends coaxially with the cylindrical housing 10. The handle shaft can be quickly unscrewed for easy carrying.

Referring to FIG. 2, the bore of the shaft 12 communicates with the interior of the housing. As shown in FIG. 1, the upper end of the shaft 12 is contoured so that it fits snugly against the exterior of the tubular handle 14. The shaft 12 is welded to the handle 14. The bore of the shaft 12 is thus sealed at its upper end by the handle 14. An outlet aperture 28 extends through the wall of the shaft 12. It is positioned so that it can be selectively covered by the end of one of the user's thumbs when his or her hands grasp opposite ends of the handle 14. When the aperture 28 is uncovered, air can be vented through the shaft 12 into the upper portion of the interior of the housing 10. This allows a core of sand contained within the housing to be released.

Means are provided for venting air to the region adjacent the open lower end 20 of the housing 10 after the housing has been inserted into the beach sand. Referring to FIG. 1, in the illustrated embodiment a vent mechanism 29 is mounted within the housing. Referring to FIG. 2, the vent mechanism 29 includes a pipe 30 which is mounted in the interior of the housing 10 and extends vertically adjacent the side wall 18 between the open lower end 20 and the upper end wall 16 of the housing. The pipe 30 preferably has a bore 32 of relatively small diameter, e.g. one-quarter inch. The externally threaded upper open end 34 of the pipe 30 is screwed into an internally threaded hole 36 through the outer portion of the upper end wall 16. The pipe 30 extends slightly above the upper end wall 16. A screw 38 extends through the lower portion of the side wall 18 and through the lower portion of the pipe 30 to secure the same in position.

Valve means are provided at the lower end of the pipe 30. Referring to FIG. 3, the lower portion 40 of the pipe bore 32 is reamed out to a larger diameter than the remainder of the bore 32. The junction between the two bores defines an annular shoulder 42. The open lower end of the pipe 30 has inwardly inclined surfaces 44 which define a valve seat, the purpose of which is described hereafter.

A valve plug 46 is slidably mounted in the lower bore portion 40 of the pipe 30. The valve plug 46 has an upper annular collar 48 which has an outside diameter slightly smaller than the diameter of the lower bore portion 40. The downward movement of the valve plug 46 is limited by the shank of the screw 38 which engages the collar 48.

The valve plug has an annular head 50 which is connected to the collar 48 by a cylindrical neck 52 which has a lesser outside diameter than that of the collar 48. The head 50 has an upper frusto-conical portion 54 which seats against the inclined surfaces 44 at the lower end of the pipe 30 to seal the lower opening thereof when the valve is moved to its upper limit of movement (closed position). The head 50 has a lower convex portion 56 which initially contacts the surface of the beach sand when the housing is inserted into the same.

A horizontal bore 58 extends through the valve plug 46 through the junction of the frusto-conical head portion 54 and the neck 52. The bore 58 is preferably located high enough on the valve plug 46 so that it is above the lower end of the pipe 30 when the valve moves to its lower limit of movement (open position). The pipe 30 shields the bore 58 so that it does not become clogged with sand upon withdrawal of the housing from the beach sand or upon release of the core of sand.

A vertical bore 60 having an upper flared portion 62 extends coaxially through the valve plug 46 from the upper end thereof to the horizontal bore 58. When the valve plug moves to its open position, air can flow from the upper end 34 of the pipe 30, through the bore 32 of the pipe, through the bores 60 and 58 in the valve plug 46 and out the lower end of the pipe.

The operation and manner of use of the clam gun previously described will now be set forth. When a user locates a clam on the beach, the sand housing 10 is inserted into the sand about the clam by pushing downwardly on the handle 14. The head 50 is pushed upwardly by the beach sand shortly after contacting its surface. The valve plug 46 moves to its closed position and the head 50 seals the lower end of the pipe 30 to prevent the lower portion 40 of the pipe bore from becoming clogged with sand during the insertion. It may be necessary to twist and rock the housing to facilitate insertion. The housing 10 is pushed downwardly into the beach sand until the clam is well within the housing. The outlet aperture 28 is not covered during the insertion so that the air inside of the housing which is displaced by sand can escape.

Next, the user covers the outlet aperture 28 adjacent the handle 14 and withdraws the housing 10 from the beach sand. As soon as the housing begins to move upwardly, a partial vacuum is created above the core of sand inside the housing. This partial vacuum serves to hold the core of sand inside the housing so that it can be removed from the beach sand. Also, when the housing begins to move upwardly a cavity begins to form in the region adjacent the lower end of the housing, below the core of sand contained therein. The air pressure inside of this cavity is initially lower than atmospheric pressure and this causes the valve plug 46 to slide downwardly to its open position. Air is vented through the pipe 30 into the cavity. This prevents the formation of a partial vacuum in the cavity as the housing is withdrawn from the beach sand which otherwise makes withdrawal substantially more difficult.

The housing containing the core of sand, and hopefully the clam embedded therein, are completely withdrawn from the beach sand. The housing is moved over a bucket or a flat surface. The outlet aperture 28 is uncovered to release the partial vacuum inside the housing above the core of sand. The core of sand and the clam embedded therein fall out of the housing and the clam is readily retrieved by hand.

The clam gun of the present invention can be modified in arrangement and detail. Various components of the device can be made of plastic. The configuration of the housing can be changed to accommodate clams of different sizes and shapes. The housing can now be made larger than was previously possible since the suction effect has been eliminated.

The construction of the vent mechanism inside the housing can be modified. For example, the pipe 30 can be secured to the outside of the housing 10. The intermediate segment of the pipe 30 can be replaced with a segment of flexible tubing, or with a conduit integrally formed in the sidewall 18 of the housing. A horizontal piston plate with a hole therethrough for slidably receiving the pipe 30 can be mounted in the housing and moved by an actuator rod extending through the handle shaft to eject the core of sand.

Such adaptations and modifications, as well as others, are within the spirit and scope of the present invention.

I claim:

1. An apparatus for digging clams from subsurface locations in beach sand comprising:
   a housing having a side wall and an open lower end and adapted to be inserted into the beach sand and thereafter withdrawn to remove a core of sand contained therein from the beach sand; and
   means for venting air to the region beneath the core of sand during withdrawal of the housing from the beach sand, said venting means including, a vertically extending pipe mounted adjacent the side wall, the pipe having a bore extending therethrough, a valve plug slidably mounted in the pipe bore and extending below the lower end of the pipe, the valve plug having a head at its lower end adapted to seat against the lower end of the pipe to seal the pipe bore when the valve plug is moved upwardly upon insertion of the housing into the beach sand, the valve plug further having a horizontal bore which extends therethrough and a vertical bore which extends from the upper end of the valve plug to the horizontal bore so that air can flow through the valve plug when the valve plug is moved downwardly during withdrawal of the housing from the beach sand, and means for limiting the downward movement of the valve plug.

2. An apparatus for digging clams from subsurface locations in beach sand comprising:

a cylindrical sand housing adapted to be inserted into the beach sand and thereafter withdrawn to remove a core of sand contained therein from the beach sand, the housing having a horizontal upper end wall, a vertically extending side wall, and an open lower end and defining in its interior a sand chamber, the upper end wall having a first hole through its center and a second hole through its outer portion adjacent the side wall;

a vertically extending tubular handle shaft having a bore therethrough, the lower end of the shaft secured in the first end wall hole so that the bore of the shaft communicates with the sand chamber, the shaft having an outlet aperture adjacent its upper end adapted to be selectively covered by a digit of a user's hand;

a horizontally extending handle secured to the upper end of the handle shaft so that the bore of the shaft is sealed thereby;

a vertically extending pipe mounted inside the sand chamber adjacent the side wall, the pipe having a cylindrical bore which extends therethrough, the upper end of the pipe secured in the second end wall hole, and the lower end of the pipe terminating adjacent the lower periphery of the side wall and having inwardly inclined downwardly facing surfaces;

a valve plug slidably mounted in the pipe bore and extending below the lower end of the pipe, the valve plug having an upper annular collar, a lower annular head, and a cylindrical neck which connects the collar and the head, the collar having an outside diameter approximating the diameter of the pipe bore, the neck having an outside diameter which is less than the outside diameter of the collar, the head having an upper frusto-conical portion which seats against the inwardly inclined surfaces of the lower end of the pipe to seal the pipe bore when the valve plug is moved upwardly upon insertion of the housing into the beach sand, the head further having a lower convex portion which initially contacts the surface of the beach sand when the housing is inserted into the same, the valve plug further having a horizontal bore which extends through the junction of the neck and the head and a vertical bore which extends from the upper end of the valve plug to the horizontal bore so that air can flow through the valve plug when the valve plug is moved downwardly during withdrawal of the housing from the beach sand; and a screw which extends through the side wall adjacent its lower periphery and through the pipe into the pipe bore, the screw positioned to engage the collar and limit downward movement of the valve plug so that when the valve plug moves to its lower limit of movement the horizontal plug bore is above the lower end of the pipe, whereby when the housing is inserted into the beach sand the valve plug moves to seal the pipe bore to prevent the same from becoming clogged with sand, and during withdrawal of the housing from the beach sand, the valve plug moves to open the pipe bore so that air can be vented through the pipe to the region beneath the core of sand to prevent the formation of a partial vacuum there which otherwise makes withdrawal more difficult.

* * * * *